United States Patent
Srinivasan et al.

(10) Patent No.: US 10,657,138 B2
(45) Date of Patent: *May 19, 2020

(54) MANAGING CONTINUOUS QUERIES IN THE PRESENCE OF SUBQUERIES

(71) Applicant: Oracle International Corporation, Redwood Shores, CA (US)

(72) Inventors: Anand Srinivasan, Bangalore (IN); Vikram Shukla, Fremont, CA (US); Unmesh Anil Deshmukh, Nagpur (IN)

(73) Assignee: Oracle International Corporation, Redwood Shores, CA (US)

(*) Notice: Subject to any disclaimer, the term of this patent is extended or adjusted under 35 U.S.C. 154(b) by 187 days.

This patent is subject to a terminal disclaimer.

(21) Appl. No.: 15/968,536

(22) Filed: May 1, 2018

(65) Prior Publication Data

US 2018/0246936 A1 Aug. 30, 2018

Related U.S. Application Data

(63) Continuation of application No. 13/830,502, filed on Mar. 14, 2013, now Pat. No. 9,990,402.

(Continued)

(51) Int. Cl.
*G06F 16/2455* (2019.01)
*G06F 16/242* (2019.01)
(Continued)

(52) U.S. Cl.
CPC ...... *G06F 16/24568* (2019.01); *G06F 16/242* (2019.01); *G06F 16/245* (2019.01);
(Continued)

(58) Field of Classification Search
None
See application file for complete search history.

(56) References Cited

U.S. PATENT DOCUMENTS 5,339,392 A 8/1994 Risberg et al.
7,062,749 B2 6/2006 Cyr et al.
(Continued)

FOREIGN PATENT DOCUMENTS

EP 2474922 7/2012
JP 4219859 8/1992
(Continued)

OTHER PUBLICATIONS

Chinese Application 201380056017.2, Office Action dated May 11, 2018, 8 pages (3 pages for the original document and 5 pages for the English translation).
(Continued)

*Primary Examiner* — Giuseppi Giuliani
(74) *Attorney, Agent, or Firm* — Kilpatrick Townsend & Stockton LLP

(57) ABSTRACT

Techniques for managing continuous queries that include subqueries are provided. In some examples, a continuous query that includes at least a subquery may be identified. Additionally, the subquery may be processed to obtain a first result or generate a logical subquery plan. Further, in some instances, the continuous query may then be processed based at least in part on the first result from the subquery or by merging a logical continuous query plan with the logical subquery plan. This may result in obtaining a second result via querying a data source with the continuous query that is based at least in part on the first result from the subquery and/or the merged plans.

20 Claims, 12 Drawing Sheets

Related U.S. Application Data

(60) Provisional application No. 61/707,641, filed on Sep. 28, 2012.

(51) Int. Cl.

| | | |
|---|---|---|
| *G06F 16/245* | (2019.01) | |
| *G06F 16/248* | (2019.01) | |
| *G06F 16/31* | (2019.01) | |
| *G06F 16/2453* | (2019.01) | |
| *G06F 16/2458* | (2019.01) | |
| *G06F 16/25* | (2019.01) | |
| *G06F 16/951* | (2019.01) | |
| *G06F 16/901* | (2019.01) | |

(52) U.S. Cl.
CPC ........ *G06F 16/248* (2019.01); *G06F 16/2453* (2019.01); *G06F 16/2455* (2019.01); *G06F 16/2456* (2019.01); *G06F 16/2474* (2019.01); *G06F 16/2477* (2019.01); *G06F 16/24535* (2019.01); *G06F 16/24539* (2019.01); *G06F 16/24553* (2019.01); *G06F 16/25* (2019.01); *G06F 16/313* (2019.01); *G06F 16/9024* (2019.01); *G06F 16/951* (2019.01)

(56) References Cited

U.S. PATENT DOCUMENTS

| | | |
|---|---|---|
| 7,348,981 B1 | 3/2008 | Buck |
| 7,603,674 B2 | 10/2009 | Cyr et al. |
| 7,672,964 B1 | 3/2010 | Yan et al. |
| 7,818,313 B1 | 10/2010 | Tsimelzon et al. |
| 7,870,167 B2 | 1/2011 | Lu et al. |
| 8,046,747 B2 | 10/2011 | Cyr et al. |
| 8,260,768 B2 | 9/2012 | Wang et al. |
| 8,316,012 B2 | 11/2012 | Abouzied et al. |
| 8,346,511 B2 | 1/2013 | Schoning et al. |
| 8,447,739 B2 | 5/2013 | Naibo et al. |
| 8,484,243 B2 | 7/2013 | Krishnamurthy et al. |
| 8,527,458 B2 | 9/2013 | Park et al. |
| 8,589,436 B2 | 11/2013 | Srinivasan et al. |
| 8,762,369 B2 | 6/2014 | Macho et al. |
| 9,256,646 B2 | 2/2016 | Deshmukh et al. |
| 9,292,574 B2 | 3/2016 | Hsiao et al. |
| 9,553,918 B1 | 1/2017 | Manion et al. |
| 9,703,836 B2 | 7/2017 | Hsiao et al. |
| 9,852,186 B2 | 12/2017 | Herwadkar et al. |
| 9,946,756 B2 | 4/2018 | Hsiao et al. |
| 9,990,402 B2 | 6/2018 | Srinivasan et al. |
| 10,042,890 B2 | 8/2018 | Hsiao et al. |
| 10,083,210 B2 | 9/2018 | Alves et al. |
| 2002/0038217 A1 | 3/2002 | Young |
| 2002/0038306 A1 | 3/2002 | Griffin et al. |
| 2002/0116362 A1 | 8/2002 | Li et al. |
| 2003/0014408 A1 | 1/2003 | Robertson |
| 2004/0201612 A1 | 10/2004 | Hild et al. |
| 2004/0243590 A1 | 12/2004 | Gu et al. |
| 2005/0120016 A1 | 6/2005 | Midgley |
| 2005/0273352 A1 | 12/2005 | Moffat et al. |
| 2006/0064487 A1 | 3/2006 | Ross |
| 2006/0089939 A1 | 4/2006 | Broda et al. |
| 2006/0100957 A1 | 5/2006 | Buttler et al. |
| 2006/0167704 A1 | 7/2006 | Nicholls et al. |
| 2006/0230029 A1 | 10/2006 | Yan |
| 2007/0156787 A1 | 7/2007 | MacGregor |
| 2007/0294217 A1 | 12/2007 | Chen et al. |
| 2008/0028095 A1 | 1/2008 | Lang et al. |
| 2008/0120283 A1 | 5/2008 | Liu et al. |
| 2008/0162583 A1 | 7/2008 | Brown et al. |
| 2008/0195577 A1 | 8/2008 | Fan et al. |
| 2008/0243451 A1 | 10/2008 | Feblowitz et al. |
| 2008/0250073 A1 | 10/2008 | Nori et al. |
| 2008/0294996 A1 | 11/2008 | Hunt et al. |
| 2008/0301086 A1 | 12/2008 | Gupta |
| 2008/0301125 A1 | 12/2008 | Alves et al. |
| 2009/0070355 A1 | 3/2009 | Cadarette et al. |
| 2009/0070786 A1 | 3/2009 | Alves et al. |
| 2009/0106215 A1 | 4/2009 | Jain et al. |
| 2009/0228434 A1 | 9/2009 | Krishnamurthy et al. |
| 2009/0271529 A1 | 10/2009 | Kashiyama et al. |
| 2009/0313198 A1 | 12/2009 | Kudo et al. |
| 2009/0327257 A1 | 12/2009 | Abouzeid et al. |
| 2010/0036831 A1 | 2/2010 | Vemuri et al. |
| 2010/0125574 A1 | 5/2010 | Navas |
| 2010/0125584 A1 | 5/2010 | Navas |
| 2010/0138405 A1 | 6/2010 | Mihaila et al. |
| 2010/0223283 A1 | 9/2010 | Lee et al. |
| 2010/0250572 A1 | 9/2010 | Chen et al. |
| 2010/0312801 A1 | 12/2010 | Ostrovsky et al. |
| 2011/0016123 A1 | 1/2011 | Pandey et al. |
| 2011/0016160 A1 | 1/2011 | Zhang et al. |
| 2011/0029484 A1 | 2/2011 | Park et al. |
| 2011/0035253 A1 | 2/2011 | Mason et al. |
| 2011/0161352 A1 | 6/2011 | De Castro et al. |
| 2011/0178775 A1 | 7/2011 | Schoning et al. |
| 2011/0179066 A1 | 7/2011 | Cardno et al. |
| 2011/0295841 A1 | 12/2011 | Sityon et al. |
| 2011/0314019 A1 | 12/2011 | Jimenez Peris et al. |
| 2012/0016866 A1 | 1/2012 | Dunagan et al. |
| 2012/0116982 A1 | 5/2012 | Yoshida et al. |
| 2012/0166417 A1 | 6/2012 | Chandramouli et al. |
| 2012/0166421 A1 | 6/2012 | Cammert et al. |
| 2013/0014088 A1 | 1/2013 | Park et al. |
| 2013/0046725 A1 | 2/2013 | Cammert et al. |
| 2013/0117317 A1 | 5/2013 | Wolf |
| 2013/0191370 A1 | 7/2013 | Chen et al. |
| 2013/0191413 A1 | 7/2013 | Chen et al. |
| 2013/0262399 A1 | 10/2013 | Eker et al. |
| 2013/0275452 A1 | 10/2013 | Krishnamurthy et al. |
| 2014/0019194 A1 | 1/2014 | Anne |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0379712 A1 | 12/2014 | Lafuente Alvarez |
| 2016/0103882 A1 | 4/2016 | Deshmukh et al. |
| 2016/0154855 A1 | 6/2016 | Hsiao et al. |
| 2018/0186183 A1 | 7/2018 | Hsiao et al. |

FOREIGN PATENT DOCUMENTS

| | | |
|---|---|---|
| JP | 2006338432 | 12/2006 |
| JP | 2007328716 | 12/2007 |
| JP | 2011039818 | 2/2011 |
| JP | 2011-221799 A | 11/2011 |
| JP | 2012168725 | 9/2012 |
| WO | 2012050582 | 4/2012 |
| WO | 2014052675 | 4/2014 |
| WO | 2014052677 | 4/2014 |
| WO | 2014052679 | 8/2014 |

OTHER PUBLICATIONS

European Application No. 14709807.3, Office Action dated May 17, 2018, 6 pages.
Japanese Application No. 2015-558217, Office Action dated May 29, 2018, 4 pages.
Japanese Application No. JP2015-534676, Office Action dated Oct. 9, 2018, 7 pages.
U.S. Appl. No. 16/014,748, Non-Final Office Action dated Jul. 10, 2019, 11 pages.
China Patent Application CN201380056017.2, Office Action dated Nov. 23, 2018, 3 pages.
China Patent Application CN201380056099.0, Office Action dated Dec. 5, 2018, 14 pages.
China Patent Application CN201380056099.0, Office Action dated Mar. 25, 2019, 18 pages.

(56) References Cited

OTHER PUBLICATIONS

China Patent Application CN201480009223.2, Office Action dated Nov. 23, 2018, 8 pages.
European Patent Application EP13776642.4, Office Action dated Oct. 8, 2018, 7 pages.
European Patent Application EP13776642.4, Summons to Attend Oral Proceedings mailed on Jul. 17, 2019, 9 pages.
Japan Patent Application JP2015-534676, Office Action dated Mar. 26, 2019, 8 pages.
Japan Patent Application JP2018-183302, Notice of Decision to Grant dated Sep. 17, 2019, 3 pages.
Business Process Management (BPM), Datasheet [online]. IBM, [retrieved on Jan. 28, 2013]. Available Online at: http://www-142.ibm.com/software/products/us/en/category/BPM-SOFTWARE.
Caching Data with SqlDataSource Control, Available Online at: https://web.archive.org/web/2011 0704142936/http://msdn.microsoft.com/en-us/library/z56y8ksb(v=VS.1 OO).aspx, Jul. 4, 2011.
SCD—Slowing Changing Dimensions in a Data Warehouse, Available Online at: https://web.archive.org/web/2011 0807085325/http:/!etl-tools.info/en/scd.html, Aug. 7, 2011.
SQL Subqueries, Available Online at:https://web.archive.org/web/20111203033655/ http:l/docs.oracle.com/cd/828359_01 /server.111/b28286/queries007.htm, Dec. 3, 2011.
What is BPM?, Datasheet [online]. IBM, Available Online at: http://www-01.ibm.com/software/info/bpm/whatis-bpm/.
U.S. Appl. No. 13/827,631, Final Office Action dated Apr. 3, 2015, 11 pages.
U.S. Appl. No. 13/827,631, Final Office Action dated Oct. 20, 2016, 12 pages.
U.S. Appl. No. 13/827,631, Final Office Action dated Aug. 30, 2017, 18 pages.
U.S. Appl. No. 13/827,631, Non Final Office Action dated Feb. 16, 2017, 16 pages.
U.S. Appl. No. 13/827,631, Non-Final Office Action dated Nov. 13, 2014, 10 pages.
U.S. Appl. No. 13/827,631, Non-Final Office Action dated Feb. 11, 2016, 12 pages.
U.S. Appl. No. 13/827,631, Notice of Allowance dated Mar. 13, 2018, 10 pages.
U.S. Appl. No. 13/827,987, Final Office Action dated Jun. 19, 2015, 10 pages.
U.S. Appl. No. 13/827,987, Non-Final Office Action dated Nov. 6, 2014, 9 pages.
U.S. Appl. No. 13/827,987, Notice of Allowance dated Jan. 4, 2016, 16 pages.
U.S. Appl. No. 13/829,958, Final Office Action dated Jun. 19, 2015, 17 pages.
U.S. Appl. No. 13/829,958, Final Office Action dated Jun. 30, 2016, 19 pages.
U.S. Appl. No. 13/829,958, Final Office Action dated Jun. 26, 2017, 22 pages.
U.S. Appl. No. 13/829,958, Non-Final Office Action dated Dec. 11, 2014, 15 pages.
U.S. Appl. No. 13/829,958, Non-Final Office Action dated Dec. 27, 2016, 20 pages.
U.S. Appl. No. 13/829,958, Non-Final Office Action dated Feb. 1, 2016, 20 pages.
U.S. Appl. No. 13/829,958, Non-Final Office Action dated Jan. 8, 2018, 22 pages.
U.S. Appl. No. 13/830,129, Non-Final Office Action dated Feb. 27, 2015, 19 pages.
U.S. Appl. No. 13/830,129, Notice of Allowance dated Sep. 22, 2015, 9 pages.
U.S. Appl. No. 13/830,378, Final Office Action dated Nov. 5, 2015, 28 pages.
U.S. Appl. No. 13/830,378, Final Office Action dated May 1, 2018, 30 pages.
U.S. Appl. No. 13/830,378, Non-Final Office Action dated Feb. 25, 2015, 23 pages.
U.S. Appl. No. 13/830,378, Non-Final Office Action dated Jul. 5, 2017, 44 pages.
U.S. Appl. No. 13/830,428, Final Office Action dated Jun. 4, 2015, 21 pages.
U.S. Appl. No. 13/830,428, Final Office Action dated May 26, 2016, 26 pages.
U.S. Appl. No. 13/830,428, Final Office Action dated Oct. 5, 2017, 33 pages.
U.S. Appl. No. 13/830,428, Non-Final Office Action dated Dec. 5, 2014, 23 pages.
U.S. Appl. No. 13/830,428, Non-Final Office Action dated Jan. 5, 2016, 25 pages.
U.S. Appl. No. 13/830,428, Non-Final Office Action dated Mar. 22, 2017, 25 pages.
U.S. Appl. No. 13/830,428, Notice of Allowance dated Apr. 2, 2018, 9 pages.
U.S. Appl. No. 13/830,502, Final Office Action dated Jun. 30, 2015, 25 pages.
U.S. Appl. No. 13/830,502, Final Office Action dated Nov. 8, 2017, 27 pages.
U.S. Appl. No. 13/830,502, Final Office Action dated Jul. 6, 2016, 28 pages.
U.S. Appl. No. 13/830,502, Non Final Office Action dated Nov. 20, 2014, 25 pages.
U.S. Appl. No. 13/830,502, Non-Final Office Action dated Dec. 11, 2015, 25 pages.
U.S. Appl. No. 13/830,502, Non-Final Office Action dated Apr. 7, 2017, 28 pages.
U.S. Appl. No. 13/830,502, Notice of Allowance dated Apr. 2, 2018, 8 pages.
U.S. Appl. No. 13/830,735, Final Office Action dated Sep. 29, 2017, 16 pages.
U.S. Appl. No. 13/830,735, Final Office Action dated Dec. 21, 2015, 20 pages.
U.S. Appl. No. 13/830,735, Non-Final Office Action dated Apr. 4, 2017, 16 pages.
U.S. Appl. No. 13/830,735, Non-Final Office Action dated May 26, 2015, 19 pages.
U.S. Appl. No. 13/830,735, Notice of Allowance dated Jan. 26, 2018, 9 pages.
U.S. Appl. No. 13/830,759, Final Office Action dated Feb. 18, 2016, 18 pages.
U.S. Appl. No. 13/830,759, Non-Final Office Action dated Aug. 7, 2015, 23 pages.
U.S. Appl. No. 13/830,759, Non-Final Office Action dated Feb. 10, 2017, 23 pages.
U.S. Appl. No. 13/830,759, Notice of Allowance dated Aug. 23, 2017, 14 pages.
U.S. Appl. No. 14/973,377, Non-Final Office Action dated Nov. 30, 2017, 17 pages.
U.S. Appl. No. 14/973,377, Notice of Allowance dated May 2, 2018, 8 pages.
U.S. Appl. No. 15/015,933, Non-Final Office Action dated Jan. 30, 2017, 11 pages.
U.S. Appl. No. 15/015,933, Notice of Allowance dated May 17, 2017, 16 pages.
Abadi et al., Aurora: A New Model and Architecture for Data Stream Management, The VLDB Journal the International Journal on Very Large Data Bases, vol. 12, No. 2, Aug. 1, 2003, pp. 120-139.
Akama et al., Design and Evaluation of a Data Management System for WORM Data Processing Journal of Information Processing, Information Processing Society of Japan, vol. 49, No. 2, Feb. 15, 2008, pp. 749-764.
Arasu et al., The CQL Continuous Query Language: Semantic Foundations and Query Execution, The VLDB Journal, vol. 15, No. 2, Jun. 2006, pp. 121-142.
Babu et al., Continuous Queries over Data Streams, SIGMOD Record, vol. 30, No. 3, Sep. 2001, pp. 109-120.
Babu et al., Exploiting k-Constraints to Reduce Memory Overhead in Continuous Queries Over Data Streams, ACM Transactions on Database Systems (TODS), vol. 29, No. 3, Available Online at: http://dl.acm.org/citation.cfmid=1016032, Sep. 2004, 37 pages.

(56) References Cited

OTHER PUBLICATIONS

Buza, Extension of CQL over Dynamic Databases, Journal of Universal Computer Science, vol. 12, No. 9, Sep. 2006, pp. 1165-1176.

Chandrasekaran et al., PSoup: A System for Streaming Queries Over Streaming Data, The VLDB Journal the International Journal on Very Large Data Bases, vol. 12, No. 2, Aug. 1, 2003, pp. 140-156.

Chen et al., NiagaraCQ: A Scalable Continuous Query System for Internet Databases, ACM SIGMOD Record, vol. 29, No. 2, Jun. 2000, pp. 379-390.

Chinese Application No. 201380056012.X, Office Action dated Jun. 1, 2017, 22 pages (12 pages of English translation and 10 pages of Original document).

Chinese Application No. 201380056017.2, Office Action dated Jul. 17, 2017, 25 pages (9 pages of English translation and 16 pages of Original document).

Chinese Application No. 201380056099.0, Office Action dated Jul. 4, 2017, 26 pages (14 pages of English translation and 12 pages of Original document).

Chinese Application No. 201380056099.0, Office Action dated Apr. 26, 2018, 8 pages (5 pages of English translation and 3 pages of Original document).

European Application No. 13776641.6, Office Action dated Apr. 3, 2018, 5 pages.

European Application No. 13776642.4, Office Action dated May 3, 2018, 5 pages.

European Application No. EP13776643.2, Office Action dated May 3, 2018, 4 pages.

Japanese Application No. 2015-534676, Office Action dated Jan. 23, 2018, 10 pages (1 page of English translation and 9 pages of Original document).

Japanese Application No. 2015-534676, Office Action dated Jun. 27, 2017, 10 pages (1 page of English translation and 9 pages of Original document).

Japanese Application No. 2015-534678, Office Action dated Apr. 24, 2018, 4 pages (1 page of English translation and 3 pages of Original document).

Japanese Application No. 2015-534678, Office Action dated Aug. 29, 2017, 4 pages (1 page of English translation and 3 pages of Original document).

Japanese Application No. 2015-534680, Office Action dated Aug. 22, 2017, 10 pages.

Kraemer, Continuous Queries over Data Streams—Semantics and Implementation, Available Online at: http://archiv.ub.uni-marburg.de/dissjz2007/0671/pdfjdjk.pdf, Jan. 1, 2007, 313 pages.

International Application No. PCT/US2013/062047, International Preliminary Report on Patentability dated Apr. 9, 2015, 10 pages.

International Application No. PCT/US2013/062047, International Search Report and Written Opinion dated Jul. 16, 2014, 12 pages.

International Application No. PCT/US2013/062050, International Preliminary Report on Patentability dated Apr. 9, 2015, 9 pages.

International Application No. PCT/US2013/062050, International Search Report and Written Opinion dated Jul. 2, 2014, 13 pages.

International Application No. PCT/US2013/062052, International Search Report and Written Opinion dated Jul. 3, 2014, 12 pages.

International Application No. PCT/US2013/062052, International Preliminary Report on Patentability dated Apr. 9, 2015, 8 pages.

Ray et al., Optimizing Complex Sequence Pattern Extraction Using Caching, Data Engineering Workshops (Icdew), IEEE 27th International Conference On, IEEE, Apr. 11, 2011, pp. 243-248.

Tho et al., Zero-Latency Data Warehousing for Heterogeneous Data Sources and Continuous Data Streams, 5th International Conference on Information integration and Web-based Applications Services, Sep. 2003, 11 pages.

Configuring Oracle CQL Processors, Available Online at https://docs.oracle.com/cd/E23943_01/dev.1111/e14301/processorcql.htm#CEPED 705, Sep. 9, 2012, pp. 1-14.

Chinese Application No. 201380056017.2, Office Action dated Nov. 23, 2018, 3 pages.

Chinese Application No. 201480009223.2, Office Action dated Nov. 23, 2018, 8 pages (3 pages for the original document and 5 pages for the English translation).

European Application No. 13776642.4, Office Action dated Oct. 8, 2018, 7 pages.

European Application No. 14709807.3, Summons to Attend Oral Proceedings mailed on Oct. 1, 2018, 8 pages.

U.S. Appl. No. 16/014,748, Final Office Action dated Feb. 27, 2020, 17 pages.

U.S. Appl. No. 15/909,716, Non-Final Office Action dated Mar. 5, 2020, 21 pages.

MANAGING CONTINUOUS QUERIES IN THE PRESENCE OF SUBQUERIES

CROSS REFERENCES TO RELATED APPLICATIONS

The present application is a continuation of, and claims the benefit and priority to U.S. application Ser. No. 13/830,502, filed Mar. 14, 2013, entitled "MANAGING CONTINUOUS QUERIES IN THE PRESENCE OF SUBQUERIES," which claims the benefit and priority under 35 U.S.C. 119(e) of U.S. Provisional Application No. 61/707,641, filed Sep. 28, 2012, entitled "REAL-TIME BUSINESS EVENT ANALYSIS AND MONITORING," the entire contents of which are incorporated herein by reference for all purposes. This application is also related to U.S. application Ser. No. 13/830,735, filed on Mar. 14, 2013, entitled "MECHANISM TO CHAIN CONTINUOUS QUERIES," now U.S. Pat. No. 9,946,756, the entire contents of which is hereby incorporated by reference as if fully set forth herein, under 35 U.S.C. § 120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Techniques for providing continuous queries in the presence of subqueries are provided. According to at least one example, a computing system may identify a continuous query that includes at least a subquery. In some cases, identifying the continuous query may include receiving the continuous query or generating the continuous query. The computing system may also process the subquery to obtain a logical plan. The computing system may also process the continuous query based at least in part on merging the continuous query plan with the logical plan to obtain a result (e.g., the query result). In some examples, the continuous query may be configured to process business event data of a stream, business event data of a relation associated with the stream, and/or business event data of a database. Additionally, in some aspects, the relation may be configured as an unordered, time-varying set of tuples associated with the a stream of business event data. Additionally, in some examples, the computing system may provide the result to a user interface of a user that provided the continuous query. The user interface may be configured to display real-time data based at least in part on the result. Additionally, in some examples, the continuous query may be dependent on a first result from the subquery. The subquery may be configured as a continuous subquery and may be included within a "from" clause or a "set" clause of the continuous query. the subquery may also be configured to obtain a set of first results over time, and less than all of the set of first results may be stored in memory and accessible for processing the continuous query to obtain the result. Further, in some cases, the computing system may also reprocess the subquery to obtain a second logical plan over time based at least in part on an indication that data associated with the subquery has changed.

According to at least one example, a computer-readable memory may store instructions that, when executed by one or more processors, may cause the one or more processors to receive a continuous query statement with at least one nested subquery statement from a user associated with business event data. Additionally, the instructions may also cause the one or more processors to process the at least one nested subquery statement to obtain at least a logical subquery plan corresponding to the business event data. The instructions may also cause the one or more processors to process the continuous query based at least in part on merging a continuous query plan with the logical subquery plan to obtain at least a second result corresponding to the business event data. In some examples, the nested subquery may include at least another subquery. The data associated with the logical subquery plan may be included in a dimension table upon which the continuous query depends. Additionally, in some examples, the instructions may cause the one or more processors to receive an exception when data of the dimension table changes. Further, the dimension table may be refreshed by re-processing the at least one nested subquery statement based at least in part on the exception.

According to at least one example, a computer-implemented method may include receiving a continuous query statement from a user associated with business event data. The method may also include determining whether the continuous query includes one or more continuous subqueries. In some examples, when the method determines that the continuous query includes one or more subqueries, the method may include processing the continuous subquery to obtain a set of first results based at least in part on implementing a clause of the continuous subquery on a stream associated with the business event data of the user and processing the continuous query by utilizing at least a subset of the set of first results to obtain second results based at least in part on implementing a clause of the continuous query on the stream associated with the business event data of the user. In some aspects, the method may also include not instantiating an operator of the continuous query when it relies on a dimension table until a time after receiving an indication that data in the dimension table has changed. The method may also include loading less than all of the set of first results in memory and/or loading only a subset of the first results in memory when the subset is associated with a low probability of changing. Further, the stream associated with the business event data of the user may include one or more archived relations.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
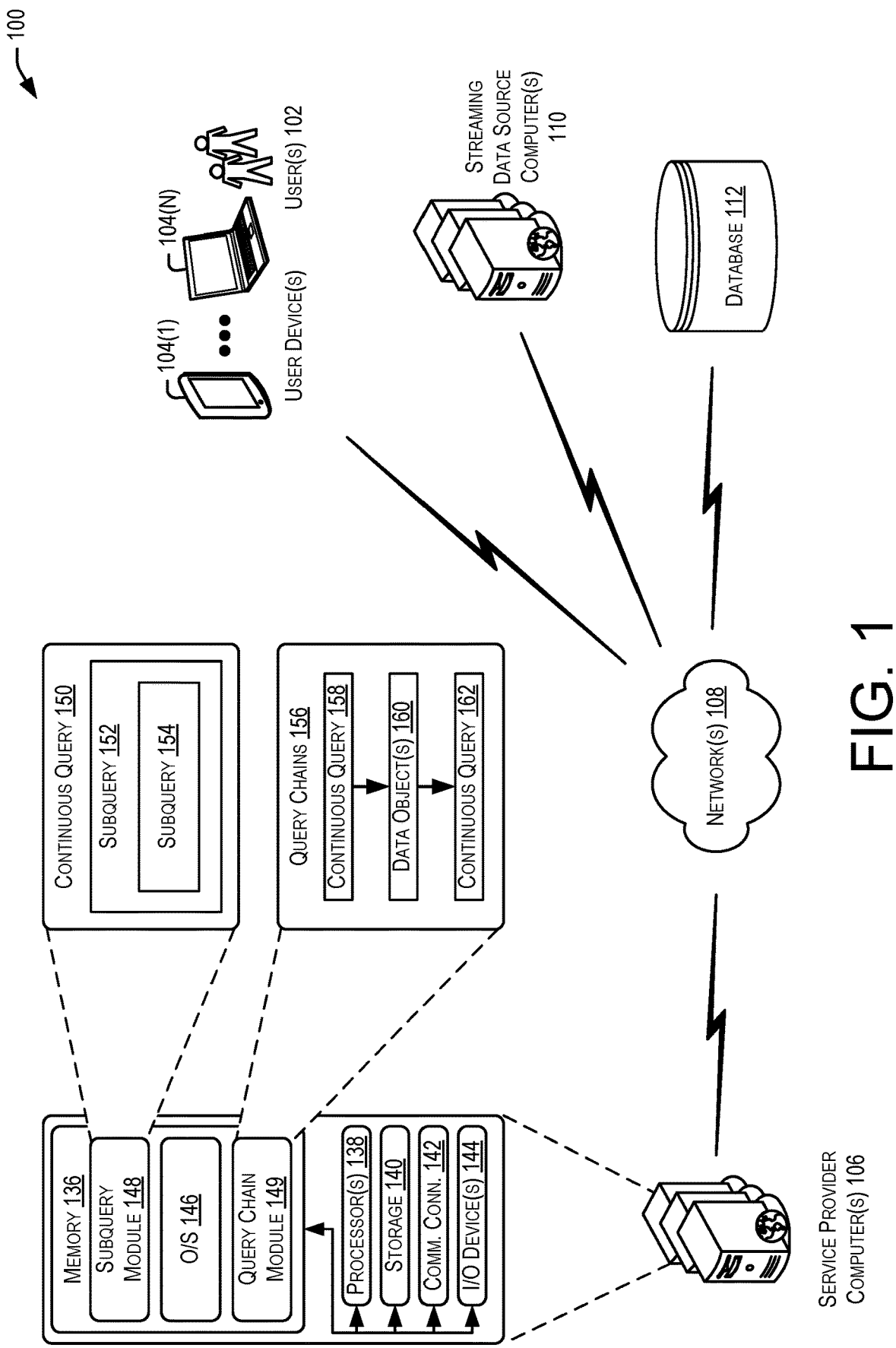
FIG. 1 is a simplified block diagram illustrating an example architecture for managing subquery and/or chaining techniques associated with continuous queries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support continuous query language (CQL) queries (also referred to as "query statements") with one or more continuous subqueries, for example, including but not limited to, nested subqueries, subqueries that operate over a time interval, subqueries that query streaming or relation data, etc., may be provided For example, in some scenarios, a query may rely on a subquery that collects data from a stream, relation, or archived relation. The query may then run utilizing the results of the subquery. Additionally, in some examples, mechanisms to support chaining (also referred to as "daisy chaining") of queries and/or data objects (DOs) may be provided. For example, a continuous query may collect data from a stream or relation and store that data in a data object. The data object may be updatable, analyzed, and/or displayed. Additional audits may be performed on the data object. Additionally, in some examples, additional continuous queries may rely on the DO.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp N+1>, <ORCL,62>), the event is <ORCL,62> with attributes "stock symbol" and "stock value." The timestamp associated with the stream element is "timestamp N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefor expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQServiceand the CQServicemay also act as a logical database (DB) gateway for a CQL engine. In this way, the CQL engine may be able to leverage the BI analytics server for its analytics capabilities and semantic modeling. In some examples, the CQL engine may be wrapped inside the CQ Service.

In some examples, the CQService may provide, among other things, the following functionalities:
Remoting service for BI Analytics Server as CQL engine Gateway;
Event source/sink adapter;
Generate data definition languages (DDLs) from logical SQL plus CQL extensions;
Provide unified model for all types of continuous queries and implementation selections;
Maintain metadata and support restartability; and
High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPI may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

In some examples, subqueries may be supported. Additionally, the CQL and/or CQL engine may support nested and/or other types of query aggregation and may provide incremental computation. Further, in some examples a slow changing dimension table may be utilized; yet, the CQL engine may still perform efficient processing. In one example, while joining a FACT table with a slow changing dimension table, one or more join operators may not be instantiated. In this way, memory utilization may be greatly reduced.

In some aspects, incremental computation may include not bringing all of a relational source (i.e., warehouse data) and/or streaming data into memory for a particular query. For example, for certain dimensions (e.g., a data source associated with a software product) utilized or referenced by the query, the data may not change very often (e.g., once a month or so). As such, there may be no need to load the entire source into memory for every query. So, in some cases, the data may be imported as a dimension table. Then, whenever a change happens to the dimension table, an exception may be thrown at runtime. In some cases, the exception may be received by the CQService and processed. Based at least in part on an indication that the exception is known and understood, the CQService may then reissue the query. In other words, the exception may be formatted as a special exception that indicates to the CQService that the query should be reissued in order to take the change in the dimension into account. Otherwise, other dependent factors, streams, data, or query tree branches may not be accurate or synchronous with the data of the dimension table. In some examples, the subquery may be a continuous subquery configured to be queried against a stream or a relation.

In some examples, based at least in part on a query tree, a parent operator (e.g., join or some other operator that may depend on data from multiple other operators or branches of the tree) may be responsible for starting the generation and/or execution of the query. That is, the stateful operator may initialize the state by loading appropriate relational data, streaming data, or relation data. Additionally, the parent operator may delegate to one of the child operators but not to the other (based at least in part on which operators include dimension tables). Further, once it is known that one of the operators includes a dimension (e.g., based at least in part on metadata associated with the relational source that indicates that it is a dimension), the parent operator may be configured to listen for changes to the dimension table. As indicated, when changes in the dimension table are found, an exception or other indication may be provided to inform the CQService to restart the query. Alternatively, the parent operator may be directly informed of the dimension table change; thus, signaling that it should reissue and/or re-initialize the query.

Additionally, in some examples, query and/or DO chaining may be provided. A Write Back DO may be a specialized Data Object and it can be configured with persistence. It may be used to store output events of a CQL query so it can be analyzed/audited or it can be used in a daisy chain manner for another CQL to sit on top. In some examples, a first query may run against a DO and insert the output events into the Write Back DO; then, a user can examine the Write Back DO for audit purposes, map it to a visualization, or author another query against the write back DO.

In some aspects, a write back DO may be used for chaining queries or binding to visualizations. A write back DO may be either a (archived) stream/archived relation DO. Additionally, in some examples, a complex query with subqueries in it can be broken up into two separate queries. A daisy chain query can be achieved by:

(Q1→WB DO1→Q2→WB DO2)

In this example, query 1 collects data based at least in part on moving window (e.g., moving average execution time for the last 60 minutes, 30 minutes, or the like) on a time interval basis (e.g., every 10 minutes, 20 minutes, or the like).

The output of the query may go into DO1, and a change data control (CDC) may kick in and send the delta into CQL Engine for Q2 to consume (e.g., pattern detection).

If Q2 is a running pattern match query (i.e., the trends continue to go up by 10% each time for at least some number of time in a row), it may output an alert to the operator.

With this approach, Q1 does not need to keep events in memory; instead, it may be configured as a tactical query which may run every few minutes (e.g., 10 or more).

In some examples, a continuous query may be registered once and it may run for a long period of time (at least until instructed to end). This continuous query may receive incoming events and perform computations in memory (e.g., pattern match, aggregation function deltas, moving average computation, etc.). It may also have the notion of range (moving window) and slide (output throttles). For example:

```
SELECT customerLocation Id,
    customerStatus,
    MAX(callProcessingtime) AS MAXcallProcessingTime
    FROM CALLCENTER_TEST1.CALLCENTER_FACT
[RANGE 60 minute ON callClosedTime SLIDE 10 minute]
```

As the range increases, the memory footprint may become large as it has to keep all these events in memory. The events may expire when they exceed the range size. As the number of queries increases, the memory footprint may become even bigger. For at least these reasons, leveraging the write back DO and chaining queries may optimize memory usage.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing subqueries and/or query chaining within a CQL may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the fast path evaluation of Boolean predicates described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a subquery module 148 and/or a query chain module 149. As used herein, modules may refer to programming modules executed by servers or clusters of servers that are part of a service. In this particular context, the modules may be executed by the servers or clusters of servers that are part of the service provider computers 106. In some examples, the subquery module 148 may be configured to, receive, identify, generate or otherwise provide one or more continuous queries 150 that may contain subqueries 152, 154 (e.g., continuous and/or tactical subqueries). For example, a continuous query 150 (e.g., a query configured to be run against a stream or relation) may include one or more subqueries 152, 154 or nested subqueries 154 upon which the query sits (i.e., on which it depends). More specifically, a continuous query 150 may include a subquery 152 which may in turn include a subquery 154 (e.g., nested within the first subquery 152). Other scenarios are possible, as desired, for example, the continuous query 150 may include two or more subqueries 152 with no nested subqueries 154, or the like.

In some examples, a CQL engine in may support nesting and/or embedding of one or more queries inside another via the mechanism of views. For example, the following CQL code may be utilized to configure such a query that includes a subquery:

create view sales_v1 as select prodid, sales as sales from sales_stream [RANGE 24 hours];
create query q0 as select prodid, sum(sales) from sales_v1 group by prodid;

In some aspects, this approach may provide modularity and reuse. Additionally, it may also create a dependency for query q0 on the view sales_v1. So the definition of view sales_v1 may, in some cases, not be changed as long as there are dependent continuous queries on it. Even for cases where the new view definition is congruent (i.e. say project list does not change in number of items, data types, and position of items), it may request replacing of each of the queries dynamically. Alternatively, or in addition, for set queries, non-standard notation may be utilized (e.g., <view> UNION <view>). This type of syntax may not be ANSI compliant; however, the CQServiceand/or CQ Engine may be configured to process it. Further, in some aspects, some queries may be generated through a sequence of workflow steps and/or destroyed on the fly. In such cases, the view mechanism may not actually be feasible, as it requests that the clients know the dependencies.

Support for nested subqueries (also known as inline queries or sub-select) may be implemented by specifying the subquery in the FROM clauses of a query where sources relations/streams are specified. Subquery support will also be extended to set operation queries. The following sets of CQL code illustrate at least three non-limiting examples:

Example 1

This example shows a select-from-where (SFW) query embedded inside another SFW query:

```
CREATE QUERY q0 AS
SELECT prodid, sum(sales)
FROM (SELECT prodid AS prodid, sales AS sales FROM sales_stream
[RANGE 24 HOURS]) AS foo
GROUP BY prodid;
```

Example 2

This example shows a subquery with a set of operations. With subquery feature, queries that define views can be specified inline as operands to the set operations as follows (as opposed to as <view$_1$> UNION ALL <view$_2$>):

```
(SELECT c1, c2, c3 FROM S0 [RANGE 5 HOURS])
UNION ALL
(SELECT c1, c2, c3 FROM S1[RANGE 5 HOURS])
```

Example 3

This query shows how an SFW query, set operation query, and subquery can be combined in a powerful way to compose a query:

```
CREATE QUERY q0 AS
SELECT *
FROM
(
    (SELECT c1, c2, c3 FROM S0 [RANGE 5 HOURS])
    UNION ALL
    (SELECT c1, c2, c3 FROM S1[RANGE 5 HOURS])
) AS foo
GROUP BY c1
ORDER BY c1
```

In some examples, each item in a SELECT clause (or project list) of a subquery containing expressions may be explicitly aliased. This is similar to having view definitions where a project list has expressions. Expressions as such may not have names, so it may be useful to name or alias them explicitly using <expr> AS <name>. Additionally, it may not be necessary to alias a project list in SELECT*FROM <source> or SELECT <sourcealias>.* FROM <source> AS sourcealias or SELECT c1, c2, c3 FROM <source> where ci refers to an attribute of the source (which can be a base stream, relation, or another subquery). This may either be derived implicitly (in case of * notation) or may be trivially obvious when each expression refers only to base attributes. For an SFW query (query contain select-from-where), the subquery itself may also be aliased. However, in some examples, it may be an error not to specify an explicit alias. For set operations, in some cases, the subquery may also not be aliased. However project items with expressions may be requested to be aliased. Names of the select items of the left query may serve as the name of the overall set operation. In some examples, subqueries may only be supported in FROM clauses of a query. However, in other examples, the subqueries may be supported in any clause of the query. Further, in some cases, there is no theoretical limit on the depth of nesting. However the amount of nesting may be affected by the amount available memory of the host computing system.

Further, in some examples, an SFW query may be a very comprehensive construct with many possible clauses and combinations thereof. Each of these clauses can refer to the "attributes" of a subquery much the same way they do for a relation and stream (e.g., in the from clause). Clauses that may support subqueries include, but are not limited to, GROUP BY, ORDER BY, MATCH_RECOGNIZE, JOIN, SELECT, WHERE, ARCHIVED RELATION, and/or VALUE WINDOW.

Additionally, in some examples, the query conversion module 149 may be configured to enable query chains and/or query aggregations. For example, a query chain 156 may include a first query (e.g., a continuous query) 158, a data object (e.g., a Write Back DO) 160, and/or a second query (e.g., another continuous query) 162. As noted above, in some aspects, the first query 158 may be queried against a stream, relation, or database, and may also store the results in the data object 160. Subsequent queries (e.g., the second query 162) may then be queried against the DO 160 to obtain a second result.

As noted above, in some examples, a Write Back Data Object may be a specialized DO and it can be configured with persistence. It may be utilized to store output events of a CQL query (e.g., the first query 158 so it can be analyzed and/or audited, or it can be utilized in a daisy chain manner for another CQL query (e.g., the second query 162) to sit on top. The first query 158 may run against an initial DO (e.g., a stream, a relation, a database, another data construct, etc.) and may insert the output events into the Write Back DO 160; then a user can examine the Write Back DO 160 for audit purposes, map it to a visualization, or choose to author another query 162 against the write back DO 160.

In at least one non-limiting example, there may be a Performance DO. Additionally, a query may be written against the Performance DO to compute the moving average processing time for a particular type of process at a certain interval and output the results into another Write Back DO "Avg Processing Time." Now a bar chart can be constructed against this DO to show the historical value. Alternatively, or in addition, another pattern match query can be written against this Write Back DO to perform trend analysis. For trend analysis queries, the first and foremost requirement may be that the data source be a stream data source which may be insert only, to which the Write Back DO belongs. Thus, in some cases, the Write Back DO may always be a stream DO (i.e. only insert, no delete, upsert, or update) and can be configured with either persistence or no persistence. When persistence is not configured, no flex table is created and the "insert" event may be processed by Persistence in memory and pass through to CQ Service.

A user 102 with a data architect role may be able to create a Write Back DO. The Write Back DO may be surfaced in a Continuous Query template or the like. The user 102 may also be allowed to choose a Write Back Data Object as an optional step. The user 102 may also be able to map the select list to the Write Back DO and/or modify the Write Back DO just like with most other DO. After a Write Back DO is defined, when the CQL query fires, the output event may be sent to Persistence via a java messaging service (JMS) tool or the like. In some cases it may leverage the JMS adapter application programming interface (API) to send out the insert event to a Persistence tool of the service provider computers 106.

In some examples, a significant performance savings can be gained by converting a complex CQL query into two separate queries with a Write Back DO in between. For example, note that in the following subquery portion, the query is running a continuous query (e.g., with an archived relation) which computes the max call processing time for the calls which were closed in the last (moving) 60 minutes and output the result every 10 minutes. In this query, all events in the last 60 minutes are stored in memory and they expired individually as time moves on. So if you have 20,000 events come in every 60 minutes, CQL Engine will store 20,000 events in memory at any given time and the max processing time is being re-computed every time an event enters the system. Finally, at every 10 minutes interval, the max processing time is being outputted as an insert stream. Additionally, in the second part of the query, note that the query is taking in the output from the subquery and it performs a pattern match where it's detecting an upward trending (the current measure is 7% more than last measure and this pattern has been detected for 7 times in a row).

CREATE QUERY CALLCENTER_TEST1.trendingQuery1 as

```
SELECT T.customerLocationId ,
    T.customerStatus ,
    T.MAXcallProcessingTime
```

```
FROM (
ISTREAM(
  SELECT customerLocationId ,
      customerStatus ,
      MAX(callProcessingTime) AS MAXcallProcessingTime
  FROM CALLCENTER_TEST1.CALLCENTER_FACT[RANGE
  60 minute ON callClosedTime SLIDE 10 minute]
    WHERE customerLocationId = 'CN'
  GROUP BY customerLocationId
  )
```

AS q

```
MATCH_RECOGNIZE (
 MEASURES
    A.customerLocationId AS customerLocationId,
    A.customerStatus AS customerStatus,C.MAXcallProcessingTime AS
MAXcallProcessingTime
 ALL MATCHES
 PATTERN (A B+ C)
 DEFINE
    B AS B.MAXcallProcessingTime>0.07*prev
(B.MAXcallProcessingTime) and count(*) < 7,
    C AS C.MAXcallProcessingTime>0.07*last
(B.MAXcallProcessingTime) and count(*) = 7
) AS T destination "jms:topic/oracle.beam.cqs.activedata"
```

Note that there's a lot of memory being consumed by the first query. Instead with the Write Back DO and the CQL Scheduled Query, the following can be achieved (e.g., since the first query only outputs every 10 minutes, one can re-write the query):
CREATE QUERY CALLCENTER_TEST1.trendingQuery1 as

```
    SELECT customerLocationId ,
        customerStatus ,
        MAX(callProcessingTime) AS MAXcallProcessingTime
      FROM CALLCENTER_TEST1.CALLCENTER_FACT
    WHERE customerLocationId = 'CN' and
    TIMESTAMPDIFF(SQL_TSI_MINUTE,
    callClosedTime, CURRENT_TIMESTAMP) < 60
    GROUP BY customerLocationId
    REFRESH ON "0:0:0" AT EVERY 10 MINUTES
    )
```

In this case, the CQL will run this query every 10 minutes and no memory is taken up while running this query. The output of this query then goes into a STREAM based Write Back DO. At that point, the second query (pattern match for trending) is then applied to this intermediate Write Back DO. With this approach, the only memory consumption is on the trending query which keeps track of the last 7 events from the Write Back DO. Additionally, a few examples of the operations of the subquery module 148, the query chain module 149, and/or the service provider computers 106 are described in greater detail below.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
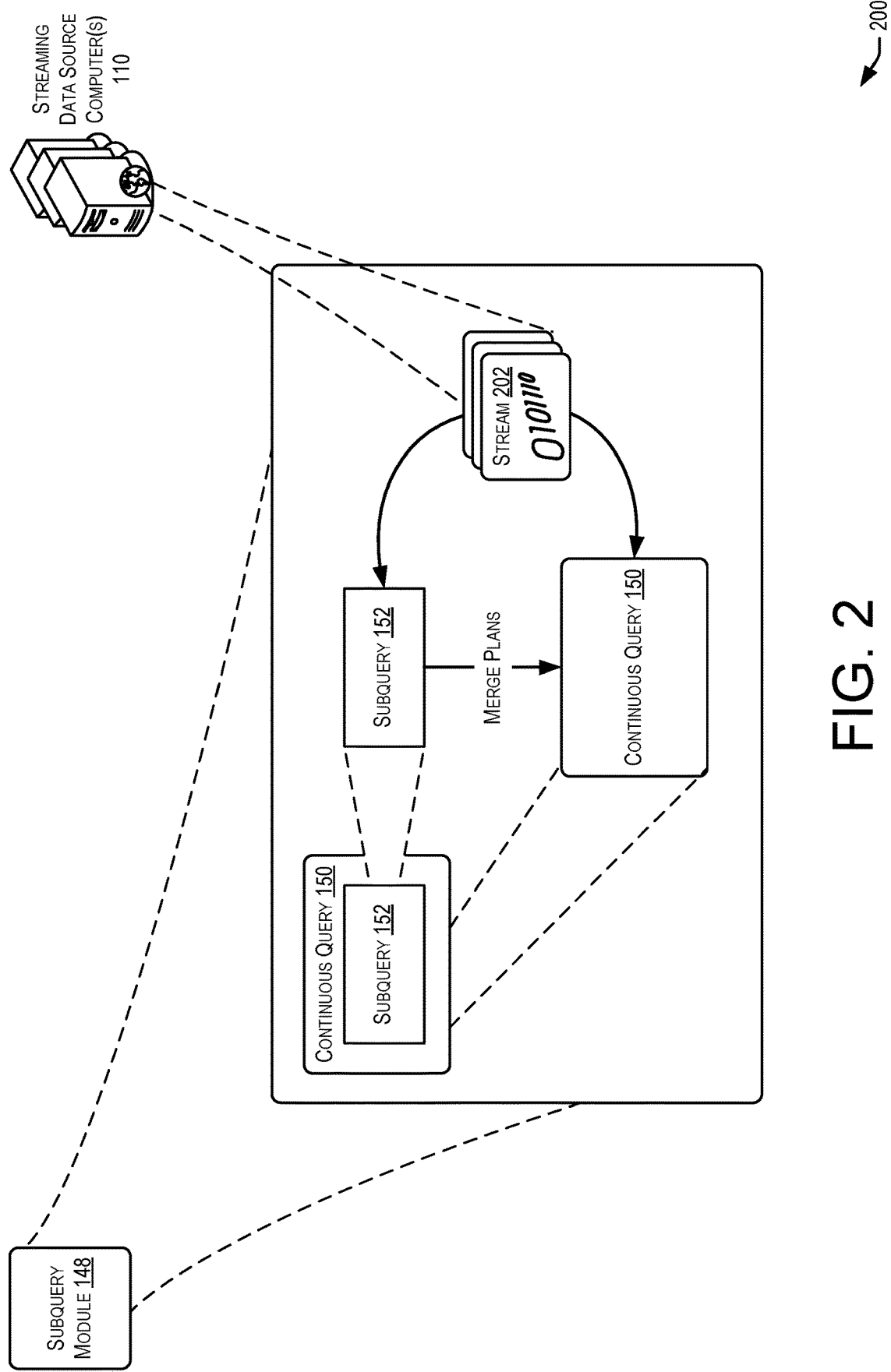
FIG. 2 is a simplified block diagram illustrating at least some features of the management of subquery and/or chaining techniques associated with continuous queries described herein, according to at least one example.

FIG. 2 illustrates a simplified block diagram 200 with which features of the management of continuous queries in the presence of subqueries may be described. As noted above, in some examples, a subquery module 148 may be executed by the service provider computers 106 of FIG. 1 and may include one or more continuous queries 150 that rely on one or more subqueries 152. In one non-limiting example, the continuous query 150 may depend on results of the subquery 152. As such, the subquery may first query against a stream 202 that may be provided or otherwise managed by the streaming data source computers 110 of FIG. 1. However, in other examples, the subquery 152 may query against a relation, a data object, or a database (e.g., a relational database or the like). Additionally, in some examples, a logical plan may be generated or otherwise built based at least in part on the subquery 152. Once the subquery has at least one result, the continuous query 150 may query against the stream 202 utilizing the results of the subquery 152. In this way, data of the stream 202 or of another stream may be accessible without having knowledge of some of the actual keys. For example, the subquery 152 may retrieve a result that can be utilized by the continuous query 150 as a key for querying against the stream 202. Further, in some aspects, the logical (or physical plan) describing the subquery 152 may be merged (e.g., at a logical layer) with a plan that is based at least in part on the continuous query 150. For example, where the continuous query 150 (i.e., the parent query in this example) expects a FROM source (e.g., a stream, relation, etc.), the logical plan for implementing the subquery 152 may be included. As such, beyond the logical layer, it may be indistinguishable whether the continuous query 150 ever included any subqueries 152. In this way, may continuous queries 150 that include the same subqueries 152 may automatically share the same plan operators.

Further, as noted above, in some examples, a slow changing dimension table may be utilized (e.g., when the subquery 152 queries against a relational source). The relational source may provide historical and/or warehoused data as opposed to streaming data. As such, some of the data obtained by the subquery 152 may not change often. Yet, when it does, the continuous query 150 may request that the subquery 152 be re-implemented in order to update or otherwise refresh the result that the continuous query 150 is relying upon.

Figure 3:
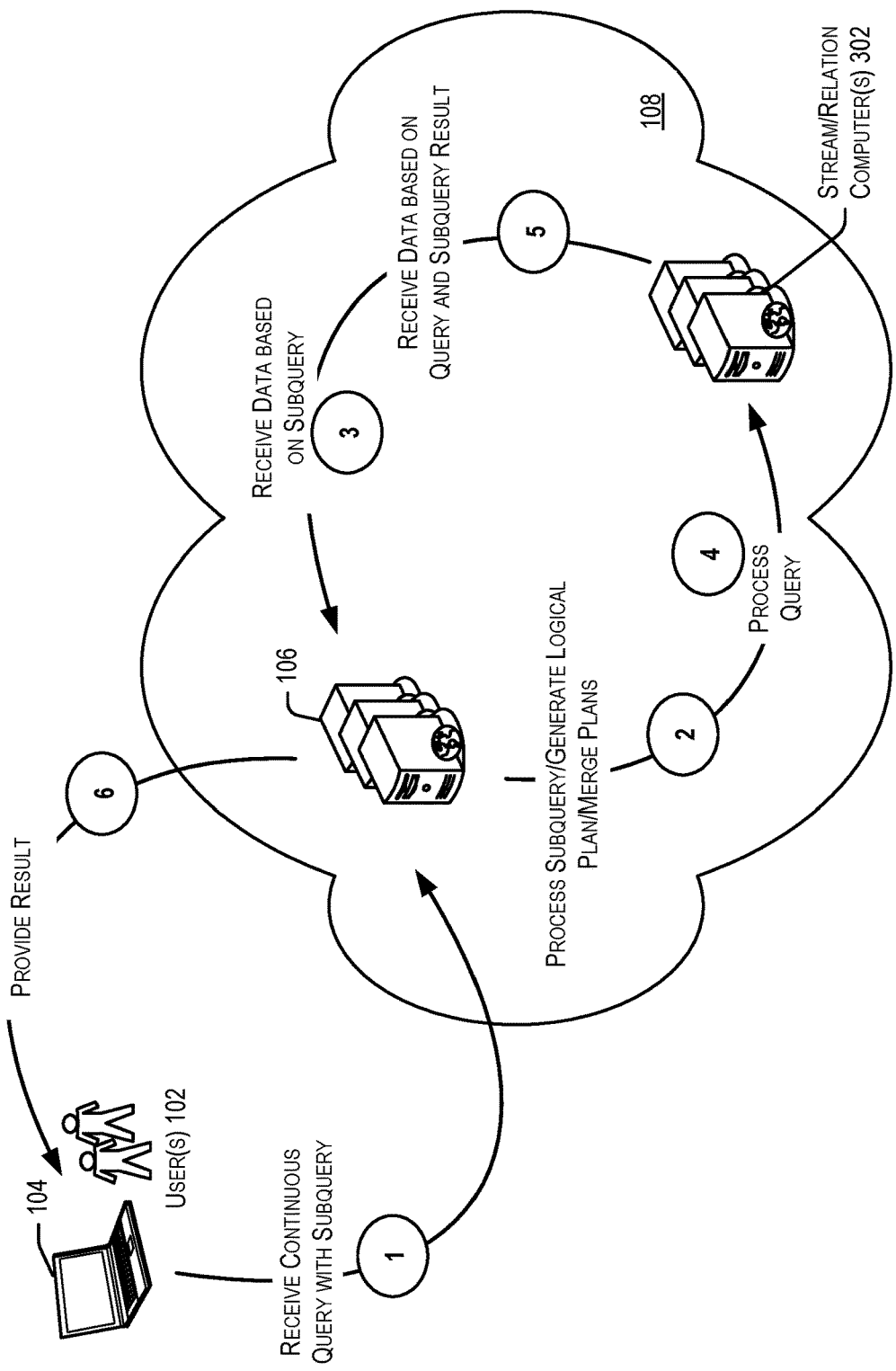
FIG. 3 is a simplified flow diagram illustrating at least some additional features of the management of subquery and/or chaining techniques associated with continuous queries described herein, according to at least one example.

FIG. 3 depicts a simplified flow diagram showing one or more techniques 300 for implementing the management of continuous queries in the presence of subqueries, according to one example. In FIG. 3, the service provider computers 106 are again shown in communication with the users 102 and/or user devices 104 via the networks 108. Additionally, in some examples, the service provider computers 106 may include or be in communication with (e.g., via the networks 108) one or more stream/relation computers 302. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the one or more service provider computers 106 described above with reference to FIGS. 1 and 2 may receive a continuous query with a subquery from the user devices 104. The continuous query may be configured to request processing (e.g., retrieval, storage, deletion, etc.) of database data (e.g., data stored in a database), streaming event data (e.g., data being received in real-time from the stream/ relation computers 302), and/or relation data (e.g., relations received from the stream/relation computers 302).

Additionally, in some examples, the service provider computers 106 may also process the subquery found within the continuous query by querying it against a relation or a stream of the stream/relation computers 302. However, in other examples, processing the subquery may include generating a logical and/or physical plan for implementing the subquery. In this way, the subquery itself may not be processed against a data source until the continuous query is processed. When a logical plan is generated, the logical plan may then be merged with a plan generated to implement the continuous query. For example, as noted above, the logical plan may be included at the FROM statement of the continuous query. In response, the service provider computers 106 may receive data based at least in part on the subquery or the data associated with the subquery may be received after merger, when the continuous query is applied against the data source (e.g., relation, stream, or other source). As noted, the continuous query may then be applied against a relation or stream, but including the results received via the subquery. As such, the continuous query may be queried against the stream or relation of the stream/relation computers 302 based at least in part on the subquery results. Additionally, in some examples, the service provider computers 106 may then receive data from the stream/relation computers 302 based at least in part on the continuous query parameters and the subquery result. Further, the service provider computers 106 may then provide the result to the user devices 104. Additionally, alerts may also be provided to the user devices 104 and/or visualization information.

Figure 4:
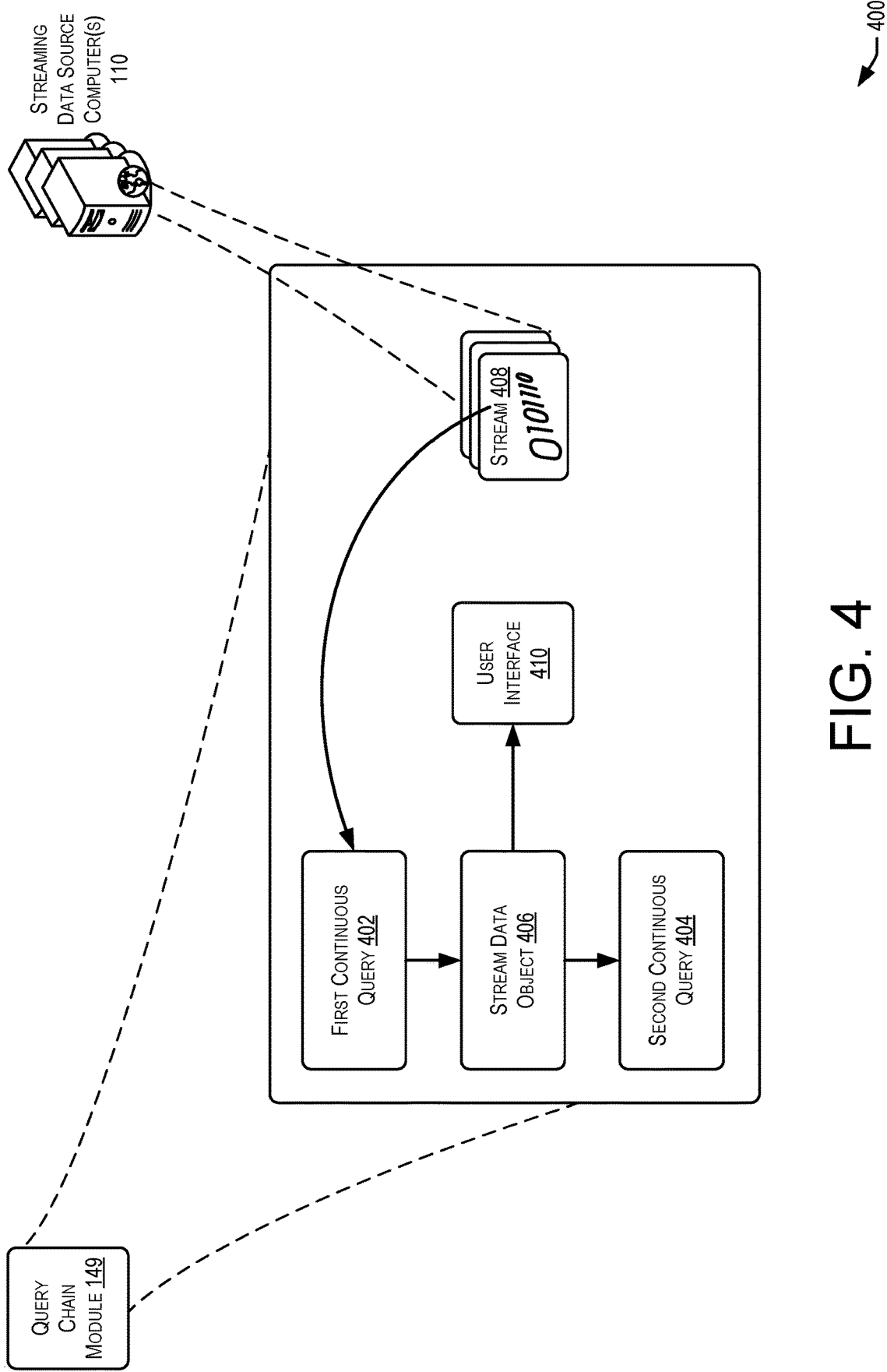
FIG. 4 is a simplified flow diagram illustrating at least some additional features of the management of subquery and/or chaining techniques associated with continuous queries described herein, according to at least one example.

FIG. 4 illustrates a simplified block diagram 400 with which features of the mechanisms for chaining continuous queries may be described. As noted above, in some examples, a query chain module 149 may be executed by the service provider computers 106 of FIG. 1 and may include one or more continuous queries 402, 404 and/or one or more data objects 406. In one non-limiting example, a second continuous query 404 may depend on or query against a data object 406. However, the DO 406 may contain results obtained via a first continuous query 402. As such, the first continuous query 402 may first query against a stream 408 that may be provided or otherwise managed by the streaming data source computers 110 of FIG. 1. However, in other examples, the first continuous query 402 may query against a relation, a data object, or a database (e.g., a relational database or the like). Once the first continuous query 402 has at least one result, that data may be stored in the DO 406. In some examples, the DO 406 may be a stream DO (e.g., only utilizing insert clauses) or it may be any type of DO.

Once the data of collected (i.e., obtained) by the first continuous query 402 is stored in the DO 406, a user or other entity may access the DO 406. For example, the data of the DO 406 may be audited, displayed, edited, or otherwise managed. As such, the data of the DO 406 may be provided to a user interface 410. Additionally, subsequent queries (e.g., the second continuous query 404) may later query against the DO 406. In this way, multiple continuous queries (or tactical queries) may be chained together, where subsequent queries rely or otherwise depend upon previous queries via DOs 406.

Figure 5:
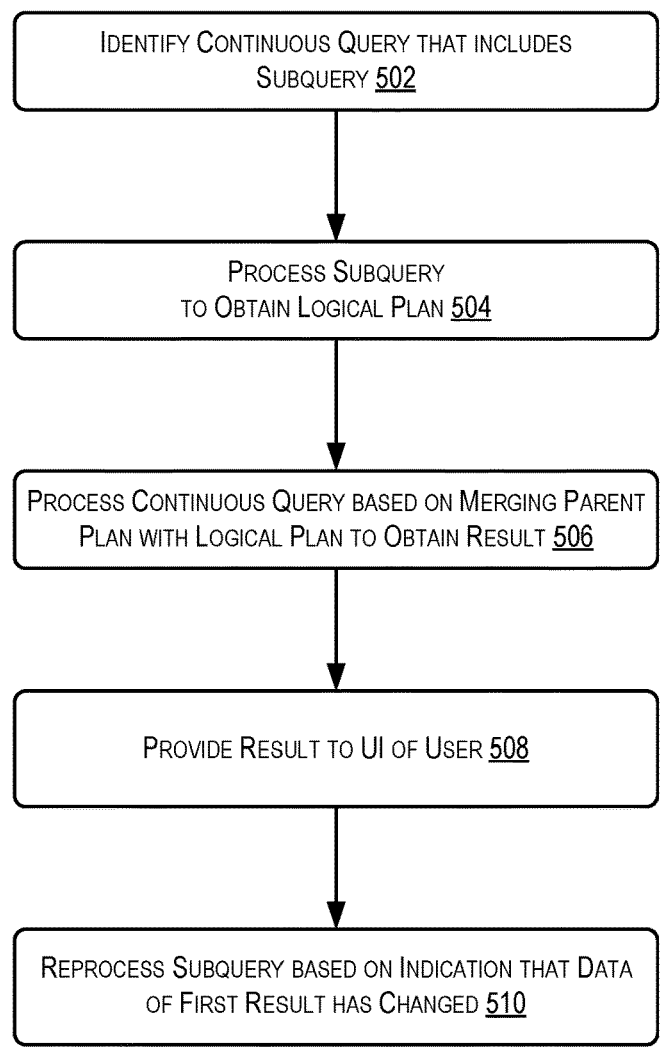
FIG. 5 is a simplified process flow illustrating at least some features of the management of subquery and/or chaining techniques associated with continuous queries described herein, according to at least one example.
Figure 6:
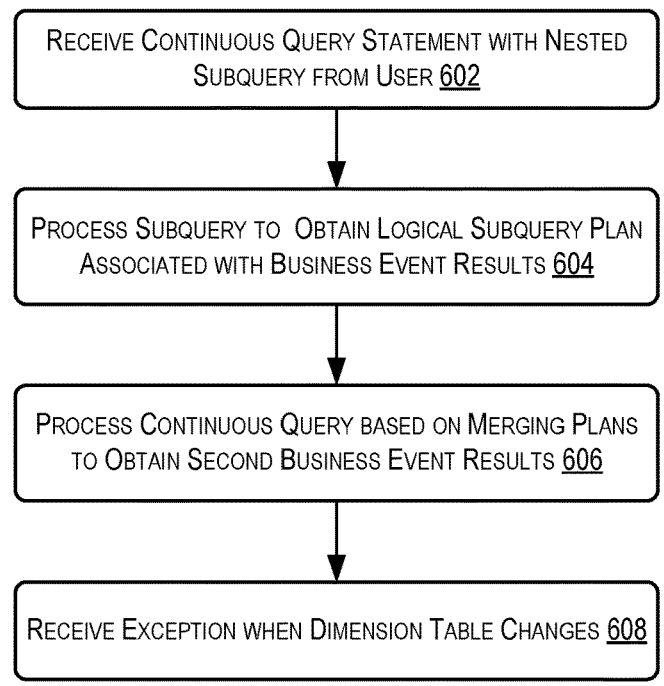
FIG. 6 is another simplified process flow illustrating at least some features of the management of subquery and/or chaining techniques associated with continuous queries described herein, according to at least one example.
Figure 7:
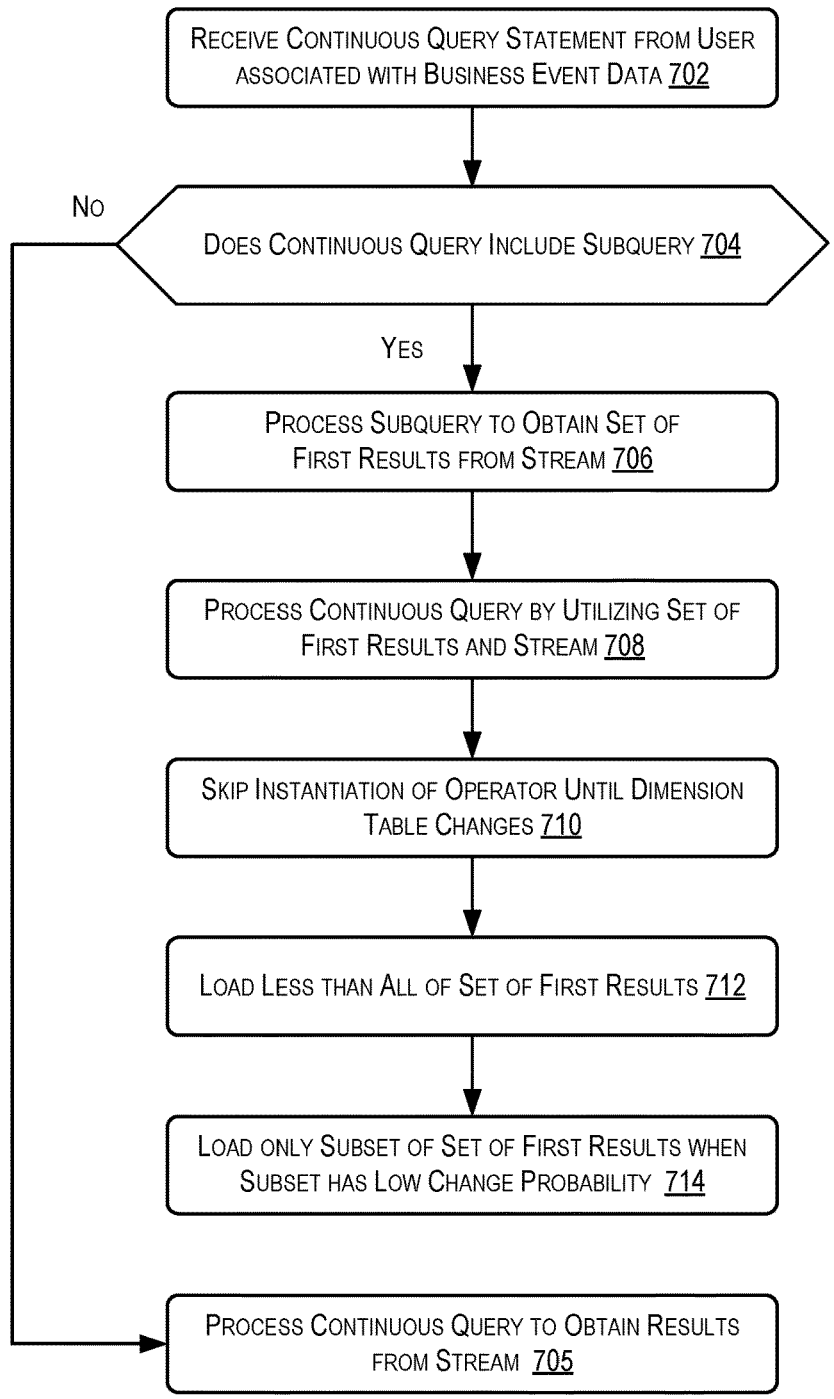
FIG. 7 is another simplified process flow illustrating at least some features of the management of subquery and/or chaining techniques associated with continuous queries described herein, according to at least one example.

FIGS. 5-7 illustrate example flow diagrams showing respective processes 500, 600, and 700 for implementing the management of continuous queries in the presence of subqueries described herein. These processes 500, 600, 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the subquery module 148 of FIG. 1) shown in FIGS. 1-3 may perform the process 500 of FIG. 5. The process 500 may begin by including identifying a continuous query that includes at least one subquery (e.g., a continuous subquery or a tactical subquery) at 502. In some examples, the process 500 may also include, at 504, processing the subquery to obtain a logical plan for implementing the subquery (e.g., the logical plan may include steps for querying against a data source with the subquery). At 506, the process 500 may also include processing the continuous query (e.g., the query that includes the subquery) based at least in part on merging the logical plan with a continuous query logical plan. For example, at the FROM statement of the continuous query (or a logical plan for implementing the continuous query) the logical subquery plan may be included. In some aspects, this may include querying against a data source (e.g., the same data source that the subquery queried against or another data source) utilizing the first result from the subquery. At 508, the process 500 may include providing the second result to a user interface of the user. Further, the process 500 may end at 510 by including reprocessing the subquery based at least in part on an indication that data of the subquery has changed.

FIG. 6 illustrates an example flow diagram showing process 600 for implementing the management of continuous queries in the presence of subqueries described herein. The one or more service provider computers 106 (e.g., utilizing at least the subquery module 148 of FIG. 1) shown in FIGS. 1-3 may perform the process 600 of FIG. 6. The process 600 may begin at 602 by including receiving a continuous query statement that includes one or more nested subqueries. The continuous query with nested subqueries may, in some examples, be received from a user. At 604, the process 600 may include processing the nested subqueries to obtain a logical plan for implementing the nested subqueries (e.g., at least one of the nested subqueries and/or at least the most nested subquery). As noted, processing a query and/or subquery may include querying a data source with the query or subquery, respectively. Additionally, in some examples, the process 600 may include processing the continuous query based at least in part on the logical plan merger (e.g., from the nested subquery) to obtain a business event result at 606. Further, at 608, the process 600 may end by including receiving an exception when a dimension table changes. For example, a dimension table may define attributes or columns associated with the results of the subquery. When the underlying data (that is, the data that the continuous query will depend upon) changes, the exception may notify the query engine to refresh or reprocess the subquery.

FIG. 7 illustrates an example flow diagram showing process 700 for implementing the management of continuous queries in the presence of subqueries described herein. The one or more service provider computers 106 (e.g., utilizing at least the subquery module 148 of FIG. 1) shown in FIGS. 1-3 may perform the process 700 of FIG. 7. The process 700 may begin by including receiving a continuous query statement from a user associated with business event data at 702. At 704, the process 700 may include determining whether the continuous query includes a continuous subquery. In some cases, when it is determined that the continuous query does not include a subquery, the process 700 may end at 705 by including processing the continuous query to obtain results from a stream or relation. However, in other examples, it may be determined, at 704, that the continuous query does include a subquery. In this example, the process 700 may instead include processing the subquery to obtain a set of first results from a stream or relation at 706. At 708, the process 700 may also include processing the continuous query by utilizing the set of first results and/or the stream or relation data. Additionally, at 710, the process 700 may include skipping instantiation of an operator until data of a dimension table changes. At 712, the process 700 may include loading less than all of the set of first results into the continuous query (e.g., for data is not expected to change often). Further, the process 700 may end at 714, where the process 700 may include loading only a subset of the set of first results when data of the subset has a low probability of changing.

Figure 8:
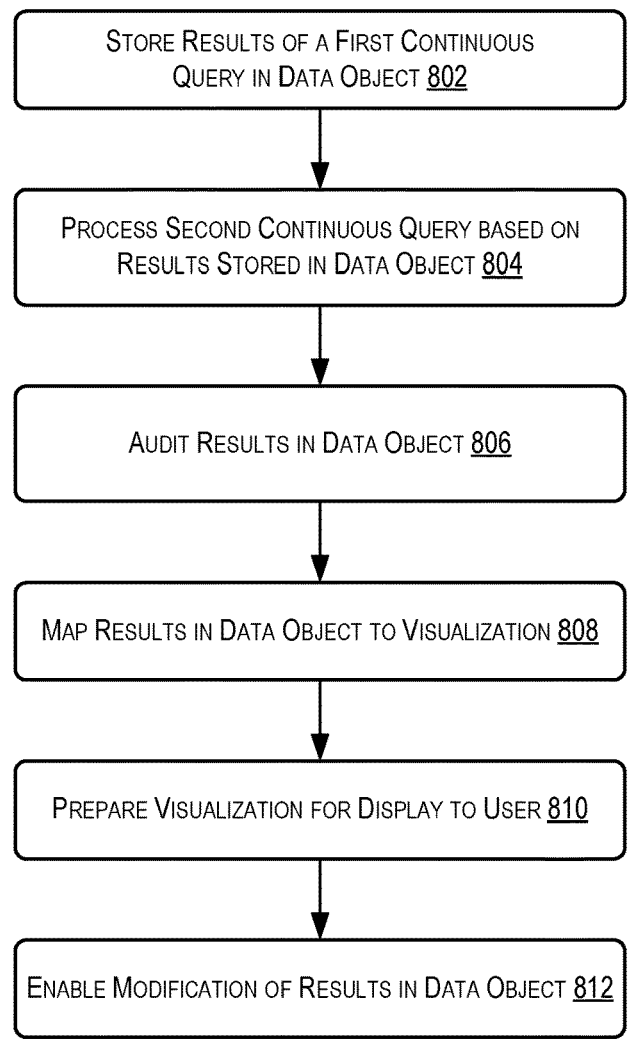
FIG. 8 is a simplified process flow illustrating at least some features of the management of subquery and/or chaining techniques associated with continuous queries described herein, according to at least one example.
Figure 9:
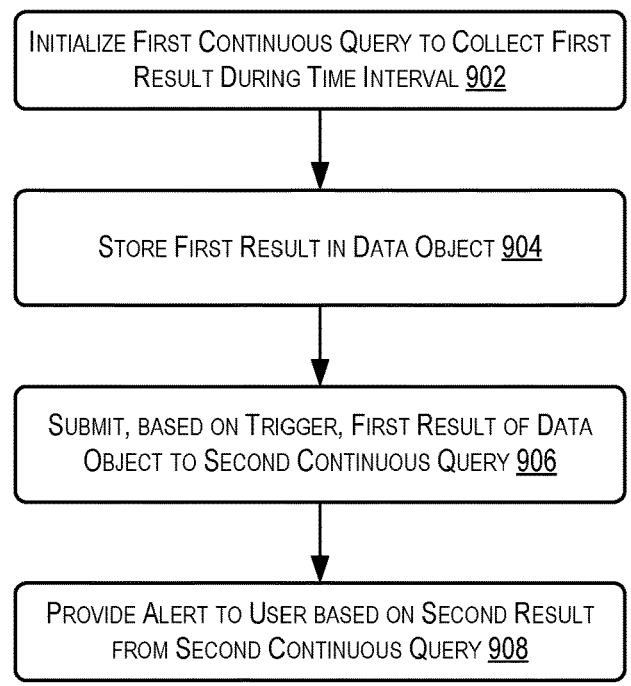
FIG. 9 is another simplified process flow illustrating at least some features of the management of subquery and/or chaining techniques associated with continuous queries described herein, according to at least one example.
Figure 10:
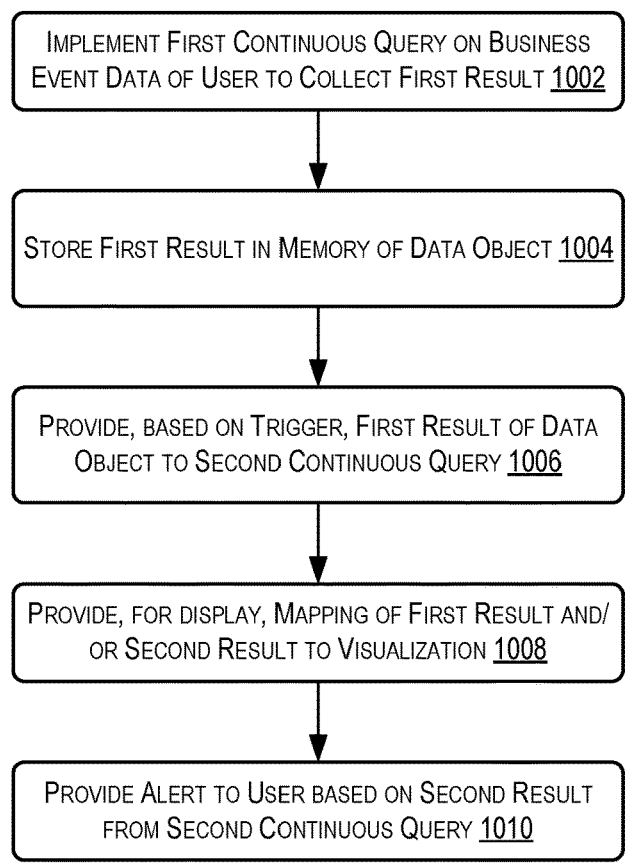
FIG. 10 is another simplified process flow illustrating at least some features of the management of subquery and/or chaining techniques associated with continuous queries described herein, according to at least one example.

FIGS. 8-10 illustrate example flow diagrams showing respective processes 800, 900, and 1000 for implementing the mechanisms for chaining continuous queries described herein. These processes 800, 900, 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the query chain module 149 of FIG. 1) shown in at least FIG. 1 may perform the process 800 of FIG. 8. The process 800 may begin by including storing results of a first continuous query in a data object at 802. The results may be the result of querying against a stream or relation with the first continuous query. At 804, the process 800 may include processing a second continuous query based at least in part on results stored in the data object. As such, the first and second continuous queries may be chained together by the data object. Additionally, at 806, the process 800 may include auditing the results of the data object. Alerts may be provided and/or, at 808, the process 800 may include mapping the results in the data object to a data visualization. At 810, the process 800 may also include preparing the visualization for display. Further, the process 800 may end at 812 by including enabling modification of the results in the data object.

FIG. 9 illustrates an example flow diagram showing process 900 for implementing the mechanisms for chaining continuous queries described herein. The one or more service provider computers 106 (e.g., utilizing at least one of the query chain module 149 of FIG. 1) shown in at least FIG. 1 may perform the process 900 of FIG. 9. The process 900 may begin at 902 by including initializing a first continuous query to collect a first result during a time interval. At 904, the process 900 may also include storing the first result in a data object (e.g., a Write Back DO configured to daisy chain continuous queries together). At 906, the process 900 may include submitting, based at least in part on a trigger, the first result of the data object to a second continuous query. Additionally, at 908, the process 900 may end by including providing an alert to a user based at least in part on the second result from the second continuous query. Further, multiple chains may be implemented by utilizing multiple different data objects configured to store results of the previous query for use by the next query.

FIG. 10 illustrates an example flow diagram showing process 1000 for implementing the mechanisms for chaining continuous queries described herein. The one or more service provider computers 106 (e.g., utilizing at least one of the query chain module 149 of FIG. 1) shown in at least FIG. 1 may perform the process 1000 of FIG. 10. The process 1000 may begin by including implementing at least a first continuous query on business event data of a user to collect a first result at 1002. At 1004, the process 1000 may also include storing the first result in a memory associated with a data object. The process 1000 may also include providing, based at least in part on a trigger, the first result stored in the data object to at least a second continuous query at 1006. At 1008, the process 1000 may also include providing, for display, a mapping of the first result and/or the second result to a business event visualization. Further, the process 100 may end, at 1010, by including providing an alert to the user based at least in part on the second result from the continuous query (e.g., falling outside a tolerance level or approaching a threshold).

Illustrative methods and systems for implementing the hybrid execution of continuous and scheduled queries are described above. Some or all of these systems and methods may, but need not, be implemented at least partially by architectures and processes such as those shown at least in FIGS. 1-10 above.

Figure 11:
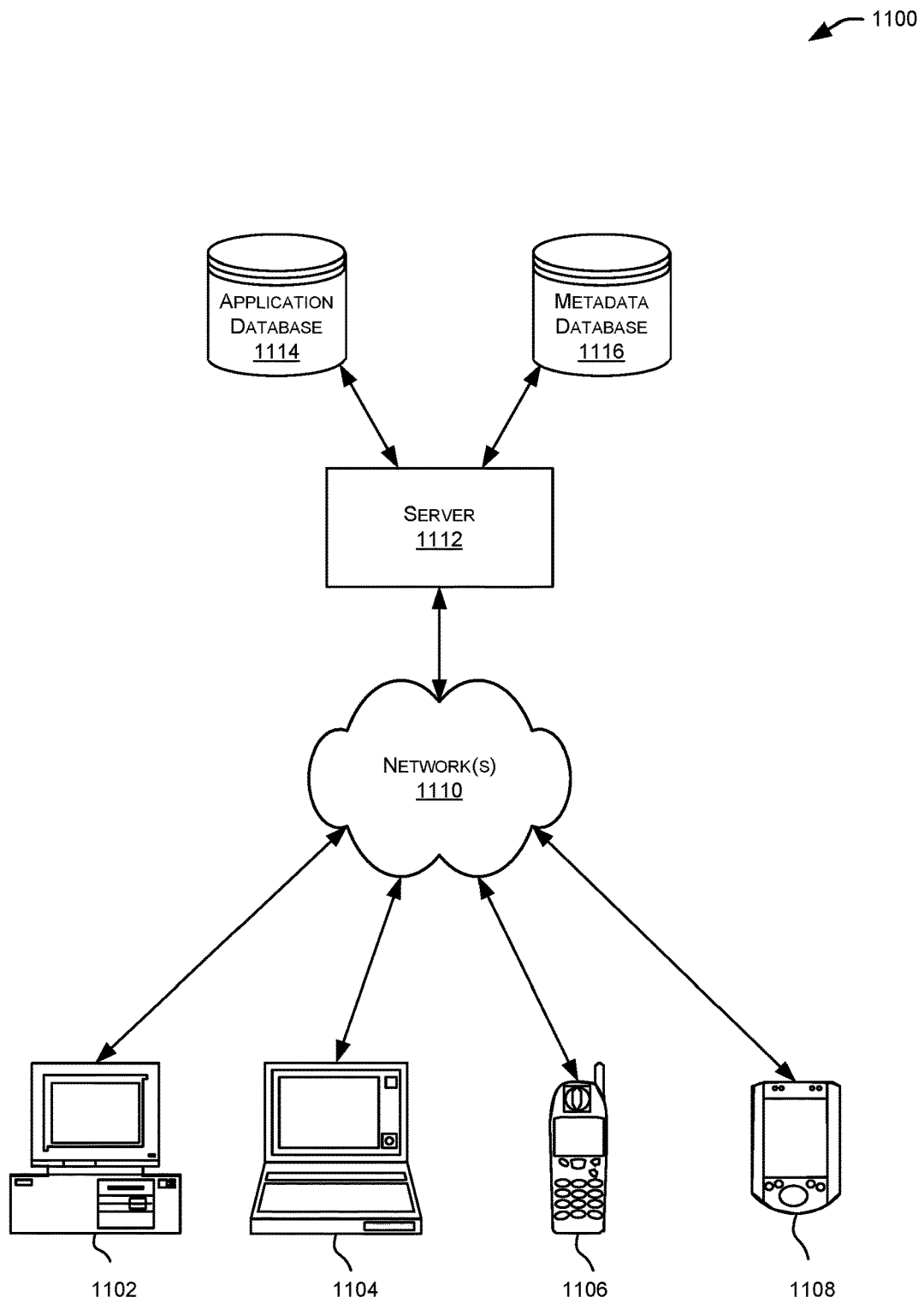
FIG. 11 is a simplified block diagram illustrating components of a system environment that may be used in accordance with an embodiment of the management of subquery and/or chaining techniques associated with continuous queries described herein, according to at least one example.

FIG. 11 is a simplified block diagram illustrating components of a system environment 1100 that may be used in accordance with an embodiment of the present disclosure. As shown, system environment 1100 includes one or more client computing devices 1102, 1104, 1106, 1108, which are configured to operate a client application such as a web browser, proprietary client (e.g., Oracle Forms), or the like over one or more networks 1110 (such as, but not limited to, networks similar to the networks 108 of FIGS. 1 and 3). In various embodiments, client computing devices 1102, 1104, 1106, and 1108 may interact with a server 1112 over the networks 1110.

Client computing devices 1102, 1104, 1106, 1108 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1102, 1104, 1106, and 1108 may be any other electronic device, such as a thin-client computer, Internet-enabled gaming system, and/or personal messaging device, capable of communicating over a network (e.g., network 1110 described below). Although exemplary system environment 1100 is shown with four client computing devices, any number of client computing devices may be supported. Other devices such as devices with sensors, etc. may interact with server 1112.

System environment 1100 may include networks 1110. Networks 1110 may be any type of network familiar to those skilled in the art that can support data communications using any of a variety of commercially-available protocols, including without limitation TCP/IP, SNA, IPX, AppleTalk, and the like. Merely by way of example, network 1110 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1100 also includes one or more server computers 1112 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1100 may also include one or more databases 1114, 1116. Databases 1114, 1116 may reside in a variety of locations. By way of example, one or more of databases 1114, 1116 may reside on a non-transitory storage medium local to (and/or resident in) server 1112. Alternatively, databases 1114, 1116 may be remote from server 1112, and in communication with server 1112 via a network-based or dedicated connection. In one set of embodiments, databases 1114, 1116 may reside in a storage-area network (SAN) familiar to those skilled in the art. Similarly, any necessary files for performing the functions attributed to server 1112 may be stored locally on server 1112 and/or remotely, as appropriate. In one set of embodiments, databases 1114, 1116 may include relational databases, such as databases provided by Oracle, that are adapted to store, update, and retrieve data in response to SQL-formatted commands.

Figure 12:
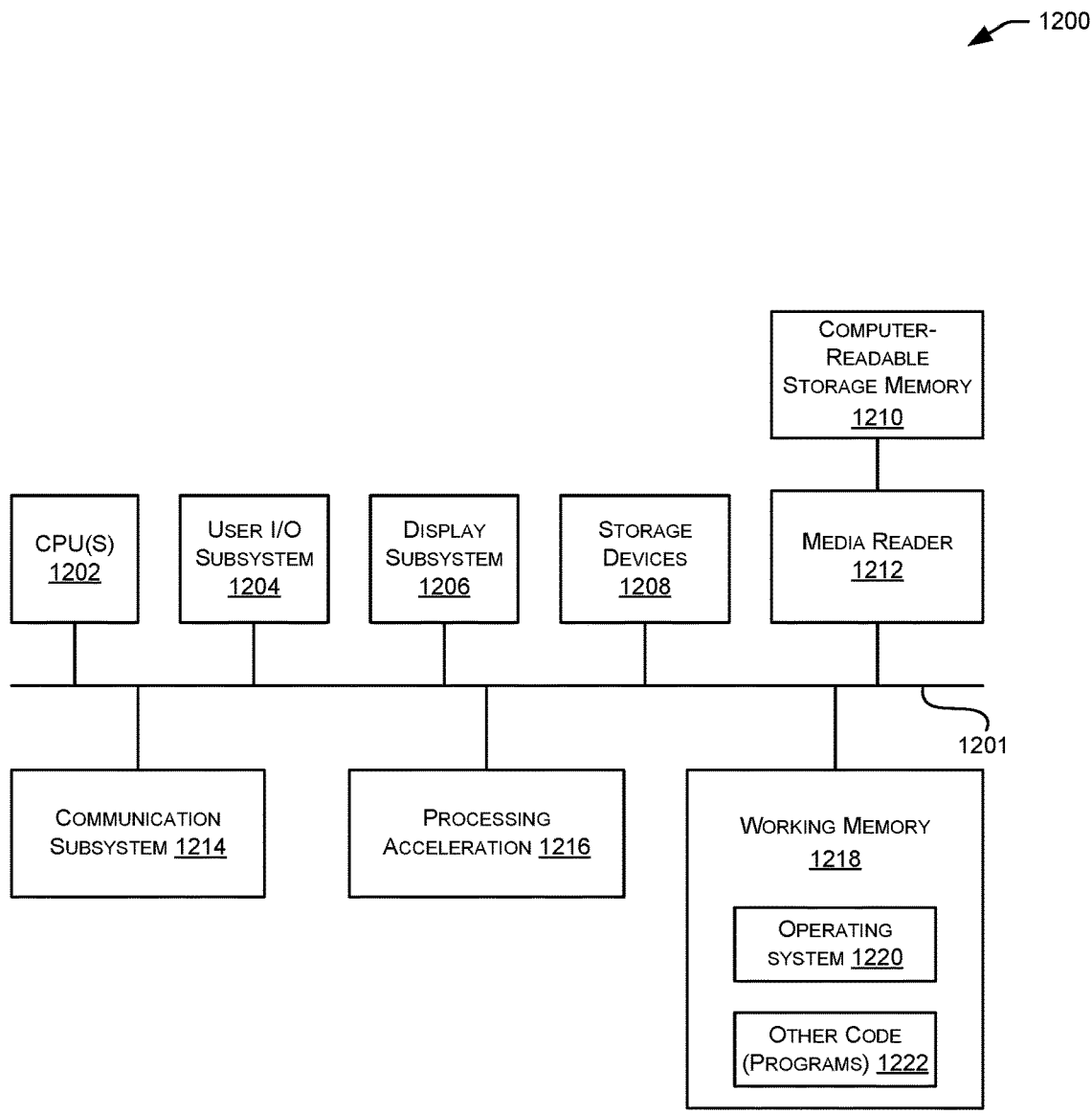
FIG. 12 is a simplified block diagram illustrating a computer system that may be used in accordance with embodiments of the management of subquery and/or chaining techniques associated with continuous queries described herein described herein, according to at least one example.

FIG. 12 is a simplified block diagram of a computer system 1200 that may be used in accordance with embodiments of the present disclosure. For example service provider computers 106 may be implemented using a system such as system 1200. Computer system 1200 is shown comprising hardware elements that may be electrically and/or communicatively coupled via a bus 1201. The hardware elements may include one or more central processing units (CPUs) 1202, one or more input devices 1204 (e.g., a mouse, a keyboard, etc.), and one or more output devices 1206 (e.g., a display device, a printer, etc.). Computer system 1200 may also include one or more storage devices 1208. By way of example, the storage device(s) 1208 may include devices such as disk drives, optical storage devices, and solid-state storage devices such as a random access memory (RAM) and/or a read-only memory (ROM), which can be programmable, flash-updateable and/or the like.

Computer system 1200 may additionally include a computer-readable storage media reader 1212, a communications subsystem 1214 (e.g., a modem, a network card (wireless or wired), an infra-red communication device, etc.), and working memory 1218, which may include RAM and ROM devices as described above. In some embodiments, computer system 1200 may also include a processing acceleration unit 1216, which can include a digital signal processor (DSP), a special-purpose processor, and/or the like.

Computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing computer-readable information. Communications system 1214 may permit data to be exchanged with network 1212 and/or any other computer described above with respect to system environment 1200.

Computer system 1200 may also comprise software elements, shown as being currently located within working memory 1218, including an operating system 1220 and/or other code 1222, such as an application program (which may be a client application, Web browser, mid-tier application, RDBMS, etc.). In an exemplary embodiment, working memory 1218 may include executable code and associated data structures used for relying party and open authorization-related processing as described above. It should be appreciated that alternative embodiments of computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
    a memory storing a plurality of instructions; and
    one or more processors configured to access the memory, wherein the one or more processors are further configured to execute the plurality of instructions to at least:
        identify a continuous query that includes a continuous subquery;
        process the continuous subquery to obtain first results from a relation associated with a data stream;
        store only a subset of the first results from the continuous subquery in a dimension table when the subset of the first results is associated with a low probability of change;
        issue the continuous query based at least in part on the dimension table corresponding to the continuous subquery;
        at least in response to receiving a runtime exception:
            identify that a change to the dimension table has occurred;
            refresh the dimension table by reprocessing the continuous subquery based at least in part on the runtime exception; and
            reissue the continuous query to obtain second results after the dimension table is refreshed;
        implement a pattern match query on the second results;
        perform trend analysis on the pattern match query results;
        provide, for display by a user interface, a mapping of the trend analysis to a visualization; and
        provide an alert in the user interface based at least in part on a pattern identified from the trend analysis.

2. The system of claim 1, wherein the relation comprises a bounded window on the data stream and a same schema for each event of the data stream.

3. The system of claim 1, wherein the relation comprises an unordered, time-varying set of tuples associated with the stream of business event data.

4. The system of claim 1, wherein the continuous query is received by the system or generated by the one or more processors.

5. The system of claim 1, wherein the user interface is provided to a user that provided the continuous query.

6. The system of claim 5, wherein the user interface is configured to display real-time data based at least in part on the second results.

7. The system of claim 1, wherein the continuous query is dependent on the dimension table from the continuous subquery.

8. The system of claim 1, wherein the continuous subquery is included within a "from" clause or a "set" clause of the continuous query.

9. The system of claim 1, wherein the continuous subquery is configured to obtain the first results over time, and wherein less than all of the first results are stored in the dimension table and accessible for processing the continuous query to obtain the second result.

10. A non-transitory computer-readable memory storing a plurality of instructions executable by one or more processors, the plurality of instructions comprising:
   instructions that cause the one or more processors to identify a continuous query that includes a continuous subquery;
   instructions that cause the one or more processors to process the continuous subquery to obtain first results corresponding to a relation associated with the business event data;
   instructions that cause the one or more processors to store only a subset of the first results from the continuous subquery in a dimension table when the subset of the first results is associated with a low probability of change;
   instructions that cause the one or more processors to issue the continuous query based at least in part on the dimension table corresponding to the continuous subquery;
   instructions that cause the one or more processors to at least in response to receiving a runtime extension:
      identify that a change to the dimension table has occurred;
      refresh the dimension table by reprocessing the continuous subquery based at least in part on the runtime exception; and
      reissue the continuous query to obtain second results after the dimension table is refreshed;
   instructions that cause the one or more processors to implement a pattern match query on the second results;
   instructions that cause the one or more processors to perform trend analysis on the pattern match query results;
   instructions that cause the one or more processors to provide, for display by a user interface, a mapping of the trend analysis to a visualization; and
   instructions that cause the one or more processors to provide an alert in the user interface based at least in part on the pattern identified from the trend analysis.

11. The non-transitory computer-readable memory of claim 10, wherein the continuous subquery includes at least another continuous subquery.

12. The non-transitory computer-readable memory of claim 10, wherein the relation comprises a bounded window on the data stream and a same schema for each event of the data stream.

13. The non-transitory computer-readable memory of claim 10, wherein the relation comprises an unordered, time-varying set of tuples associated with the stream of business event data.

14. The non-transitory computer-readable memory of claim 10, wherein the continuous query is received by the system or generated by the one or more processors.

15. The non-transitory computer-readable memory of claim 10, wherein the user interface is provided to a user that provided the continuous query.

16. A computer-implemented method, comprising:
   identifying a continuous query that includes a continuous subquery;
   processing the continuous subquery to obtain first results from a relation associated with a data stream;
   storing only a subset of the first results from the continuous subquery in a dimension table when the subset of the first results is associated with a low probability of change;
   issuing the continuous query based at least in part on the dimension table corresponding to the continuous subquery;
   at least in response to receiving a runtime exception:
      identifying that a change to the dimension table has occurred;
      refreshing the dimension table by reprocessing the continuous subquery based at least in part on the runtime exception; and
      reissuing the continuous query to obtain second results after the dimension table is refreshed;
   implementing a pattern match query on the second results;
   performing trend analysis on the pattern match query results;
   providing, for display by a user interface, a mapping of the trend analysis to a visualization; and
   providing an alert in the user interface based at least in part on a pattern identified from the trend analysis.

17. The computer-implemented method of claim 16, further comprising not instantiating an operator of the continuous query until a time after the data in the dimension table has changed.

18. The computer-implemented method of claim 16, further comprising loading less than all of the set of first results in the dimension table.

19. The computer-implemented method of claim 16, wherein the relation comprises a bounded window on the data stream and a same schema for each event of the data stream.

20. The computer-implemented method of claim 16, wherein the relation comprises an archived relation.

* * * * *

UNITED STATES PATENT AND TRADEMARK OFFICE
CERTIFICATE OF CORRECTION

Page 1 of 1

PATENT NO. : 10,657,138 B2
APPLICATION NO. : 15/968536
DATED : May 19, 2020
INVENTOR(S) : Srinivasan et al.

It is certified that error appears in the above-identified patent and that said Letters Patent is hereby corrected as shown below:

On the Title Page

On page 3, Column 1, under Other Publications, Line 19, delete "!etl-" and insert -- /etl- --, therefor.

On page 3, Column 1, under Other Publications, Line 21, delete "http:l/docs." and insert -- http://docs. --, therefor.

In the Specification

In Column 2, Lines 7-8, delete "the a" and insert -- the --, therefor.

In Column 2, Line 16, delete "the" and insert -- The --, therefor.

In Column 5, Line 50, delete "(<timestamp N+1>," and insert -- (<timestamp_N+1>, --, therefor.

In Column 5, Line 52, delete ""stock symbol" and "stock value."" and insert -- "stock_symbol" and "stock_value." --, therefor.

In Column 5, Line 53, delete ""timestamp N+1"." and insert -- "timestamp_N+1". --, therefor.

In Column 6, Line 36, delete "CQServiceand the CQServicemay" and insert -- CQService and the CQService may --, therefor.

In Column 12, Line 31, delete "CQServiceand/or" and insert -- CQService and/or --, therefor.

In Column 13, Line 49, delete "from" and insert -- FROM --, therefor.

In Column 15, Line 13, before "AS" insert -- ) --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*